United States Patent
Popp et al.

(10) Patent No.: US 12,526,785 B2
(45) Date of Patent: Jan. 13, 2026

(54) REGIONAL CLASSIFICATION OF RESOURCE BLOCK ALLOCATION DURING POWER BOOST FOR SHAPED TRANSMISSION

(71) Applicant: Apple Inc., Cupertino, CA (US)

(72) Inventors: Daniel Popp, Munich (DE); Anatoliy S Ioffe, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 625 days.

(21) Appl. No.: 17/891,611

(22) Filed: Aug. 19, 2022

(65) Prior Publication Data

US 2023/0199743 A1  Jun. 22, 2023

Related U.S. Application Data

(60) Provisional application No. 63/292,249, filed on Dec. 21, 2021.

(51) Int. Cl.
*H04W 72/044* (2023.01)
*H04B 10/293* (2013.01)
(Continued)

(52) U.S. Cl.
CPC ...... *H04W 72/0473* (2013.01); *H04B 10/293* (2013.01); *H04B 17/382* (2015.01);
(Continued)

(58) Field of Classification Search
CPC . H04W 72/04; H04W 28/00; H04W 28/0221; H04W 52/383; H04W 72/0473;
(Continued)

(56) References Cited

U.S. PATENT DOCUMENTS

2011/0134809 A1\* 6/2011 Yu ............ H04L 5/0048
  375/269
2012/0236735 A1\* 9/2012 Nory .......... H04W 52/365
  370/252

(Continued)

FOREIGN PATENT DOCUMENTS

| CN | 106455090 A | 2/2017 |
| CN | 111955032 A | 11/2020 |
| WO | 2021162497 A1 | 8/2021 |

OTHER PUBLICATIONS

ETSI, "138 101-1 V16.9.0", Oct. 2021, pp. 1-415 (Year: 2021).\*
(Continued)

*Primary Examiner* — Salvador E Rivas
(74) *Attorney, Agent, or Firm* — FLETCHER YODER PC

(57) ABSTRACT

The present disclosure is directed to techniques to facilitate power boosting for wireless communication devices (e.g., user equipment). The user equipment may be subject to specifications (e.g., the 3GPP specification) that require maximum power reduction (MPR) depending on the resource block allocation region in which the user equipment is operating. However, certain regions defined by the 3GPP specification may not facilitate transmission power boost as applied to shaped (e.g., modulated) transmissions. The techniques disclosed herein include defining the regions such that the MPR restrictions applied to the user equipment are reduced or minimized for allocations that enable power boosting. The regions may be defined using parameters based on a maximum number of resource blocks specified for a certain channel bandwidth, the amount of allocated resource blocks, and the resource block at which the allocation begins.

20 Claims, 10 Drawing Sheets

(51) Int. Cl.
*H04B 17/382* (2015.01)
*H04L 5/00* (2006.01)
*H04L 47/70* (2022.01)
*H04W 28/20* (2009.01)
*H04W 52/28* (2009.01)
*H04W 52/38* (2009.01)
*H04W 72/0453* (2023.01)
*H04W 28/00* (2009.01)
*H04W 28/02* (2009.01)
*H04W 52/00* (2009.01)
*H04W 72/04* (2023.01)

(52) U.S. Cl.
CPC ............ *H04L 5/0035* (2013.01); *H04L 47/70* (2013.01); *H04W 28/20* (2013.01); *H04W 52/286* (2013.01); *H04W 52/383* (2013.01); *H04W 72/0453* (2013.01); *H04W 28/00* (2013.01); *H04W 28/0221* (2013.01); *H04W 52/00* (2013.01); *H04W 72/04* (2013.01)

(58) Field of Classification Search
CPC ...... H04W 52/00; H04L 47/70; H04L 5/0035; H04B 17/382; H04B 7/1855; H04B 10/293
See application file for complete search history.

(56) References Cited

U.S. PATENT DOCUMENTS

| | | | |
|---|---|---|---|
| 2014/0086195 | A1 | 3/2014 | Jung et al. |
| 2016/0183265 | A1* | 6/2016 | Webb .................. H04W 52/367 370/329 |
| 2018/0359711 | A1* | 12/2018 | Akkarakaran ...... H04W 52/325 |
| 2018/0368133 | A1* | 12/2018 | Park ...................... H04L 5/0064 |
| 2019/0305911 | A1* | 10/2019 | Sarkis .................. H04L 5/0048 |
| 2020/0280926 | A1 | 9/2020 | Piipponen |
| 2020/0314765 | A1 | 10/2020 | Jung et al. |
| 2020/0351797 | A1 | 11/2020 | Frank |
| 2021/0007059 | A1 | 1/2021 | Piipponen |
| 2021/0037478 | A1* | 2/2021 | Yang ................... H04W 52/247 |
| 2022/0109594 | A1 | 4/2022 | Baldemair |
| 2022/0394627 | A1 | 12/2022 | Piipponen |
| 2023/0081729 | A1 | 3/2023 | Hwang |
| 2023/0085404 | A1 | 3/2023 | Park et al. |
| 2023/0216604 | A1 | 7/2023 | Yu |
| 2024/0267166 | A1* | 8/2024 | Pajukoski ......... H04L 25/03834 |

OTHER PUBLICATIONS

Huawei, et al., "WF on Optimisations of Pi/2 BPSK UL Power in NR," 3GPP TSG-WG RAN4 Meeting #101-e, R4-2120022, Nov. 1-12, 2021, pp. 1-7.
Qualcomm, "WF on Waveform configuration, parameters for link simulations and agreements," 3GPP TSG-RAN WG4#99-e Meeting, R4-2108018, Jan. 19-May 27, 2021, pp. 1-9.
Apple, "Considerations and simulation results for pi/2 BPSK," 3GPP RAN WG4 Meeting #101e, R4-2117968, Nov. 1-12, 2021, pp. 1-5.
"3rd Generation Partnership Project; Technical Specification Group Radio Access Network; Nr; User Equipment (UE) radio transmission and reception; Part 1: Range 1 Sstandalone (Release 17)", 3GPP Standard, Technical Specification; 3GPP TS 38.101-1, vol. RAN WG4, No. V17.3.0, Oct. 6, 2021, pp. 1-580 (XP052057127) [retrieved from internet—https://ftp.3gpp.org/Specs/archive/38_series/38.101-1/38101-1-h30.zip 38101-1-h30.docx—retrieved on Oct. 6, 2021].
Extended European Search Report for European Application No. 22197390.2 dated May 24, 2023; 11 pgs.
3GPP TS 38.101-1 V17.3.0; 3gpp Working Group, user Equipment (UE) radio transmission and reception Part 1: range 1 Standalone (Release 17) (Sep. 30, 2021); 29 pgs.
3GPP tsg_ranwg4_radio; Apple, R4-2117968 Considerations and simulations results for; (Oct. 23, 2021); 5 pgs.
3GPP tsg_ranwg4_radio; Intel Corporation, R4-1913466—MPR enhancement with Pi2 BPSK DMRS; (Nov. 9, 2019); 3 pgs.
3GPP tsg_ranwg4_radio; R4-2113298_Draft CR for 38.101-1 Rel15 corrections on power tolerance and UE additional maximum output power reduction; (Aug. 6, 2021); 6 pgs.
ETSI, "138 101-1 V16.9.0" Ocrober 2021, pp. 1-415 (Year 2021).

* cited by examiner

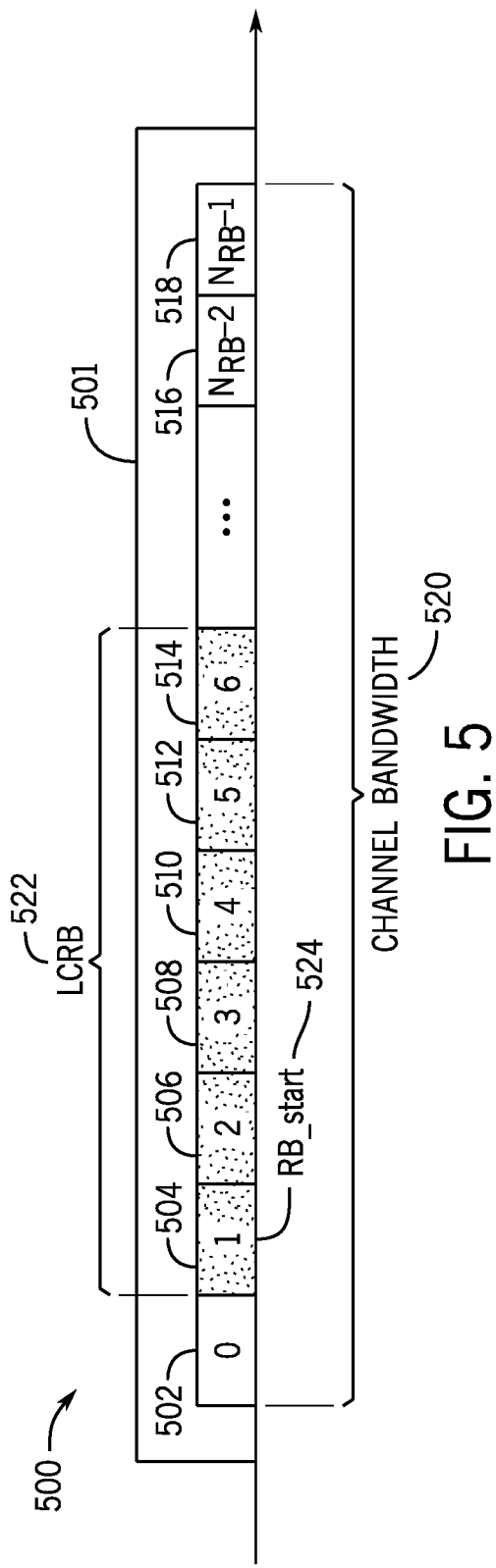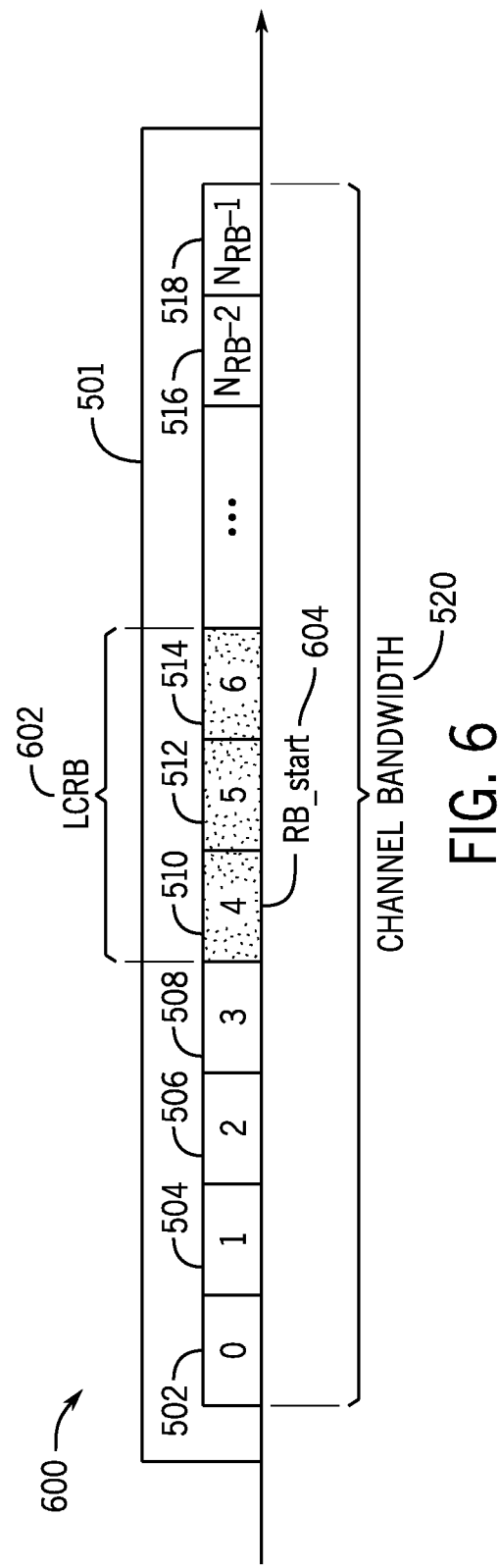

REGIONAL CLASSIFICATION OF RESOURCE BLOCK ALLOCATION DURING POWER BOOST FOR SHAPED TRANSMISSION

CROSS-REFERENCE TO RELATED APPLICATIONS

This application claims priority to U.S. Provisional Application No. 63/292,249, filed Dec. 21, 2021, entitled "REGIONAL CLASSIFICATION OF RESOURCE BLOCK ALLOCATION DURING POWER BOOST FOR SHAPED TRANSMISSION," which is incorporated by reference in its entirety for all purposes.

BACKGROUND

The disclosure relates generally to wireless communication, and, more particularly, allocation of resource blocks in wireless communication devices. A communication device may transmit signals at a power level based on a region of frequency in which the communication device operates. The region may be defined according to resource block allocation. However, certain region definitions may not facilitate transmission power boost as applied to shaped (e.g., modulated) transmissions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, user equipment includes a receiver, a transmitter and processing circuitry communicatively coupled to the receiver and the transmitter. The processing circuitry may receive, via the receiver, a first indication of a resource block allocation from a base station, the resource block allocation corresponding to one or more resource block allocation regions of at least four resource block allocation regions, each resource block allocation region of the at least four resource block allocation regions corresponding to a different maximum power reduction value. The processing circuitry may transmit the signal, via the transmitter, based on the resource block allocation region while operating in a power boost mode.

In another embodiment, a tangible, non-transitory, computer-readable medium may include instructions that, when executed by one or more processors, cause the one or more processors to detect a first indication of a base station; synchronize to the base station; send, to the base station, a second indication of a distance from the base station; receive, via a receiver, a third indication of a resource block allocation from the base station for transmitting the signal, the resource block allocation corresponding to a resource block allocation region; decrease transmission power of a transmitter by a maximum power reduction value resulting in a reduced transmission power based on a spectral shaping filter, the resource block allocation, or both; and transmit a signal, via the transmitter, at the reduced transmission power using the resource block allocation.

In yet another embodiment, a method may include detecting a first indication of a base station; synchronizing to the base station; sending, to the base station, a second indication of a distance from the base station; receiving, from the base station, a third indication of a resource block allocation based on a plurality of resource block allocation regions and a fourth indication of a maximum power reduction value corresponding to the resource block allocation based on the second indication of the distance; and transmitting a signal at a power level based on the fourth indication of the maximum power reduction value.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 5 is a diagram of an outer region allocation granted by the wireless communication network of FIG. 3 for a channel;

FIG. 6 is a diagram of an inner region allocation granted by the wireless communication network of FIG. 3 for a channel;

DETAILED DESCRIPTION OF SPECIFIC EMBODIMENTS

Figure 1:
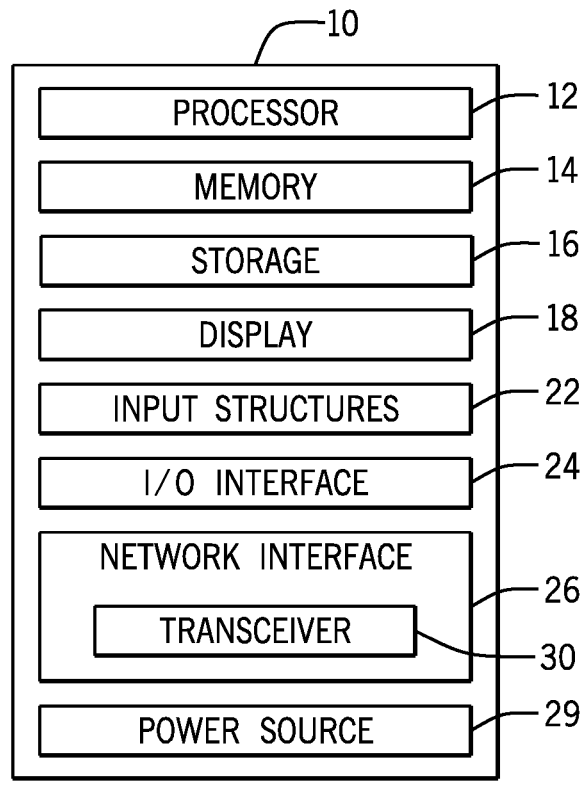
FIG. 1 is a block diagram of an electronic device, such as user equipment, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to resource block allocation for a wireless communication device (e.g., user equipment). A cellular network may allocate a frequency range (e.g., a frequency channel or frequency band) for which the user equipment may transmit signals. When transmitting a signal, the user equipment may generate radio frequency signals (e.g., emissions) outside of the allocated channel. To avoid or reduce such out-of-channel (or out-of-band) emissions, a non-governmental (e.g., the $3^{rd}$ Generation Partnership Project (3GPP)) or governmental (e.g., the United States Federal Communications Commission) regulatory body may provide specifications or regulations that may limit the maximum power output of transmissions. To comply with specifications and/or regulations, the user equipment may reduce output power of a transmission signal. This power reduction may be referred to as maximum power reduction (MPR). In practice, the MPR may be an amount of transmission power reduction for the user equipment to back off, and may be applied in multiple and/or incremental steps.

Resource block allocations may determine the location or "region" (e.g., frequency ranges) of the user equipment transmission. The region of the transmission may be a function of a resource block allocation, where the resource block allocation includes a number of resource blocks allocated for a transmission (referred to as length of contiguous resource blocks or LCRB) and a resource block at which the allocation starts or begins (referred to as RB_start). A resource block may be defined by the 3GPP specification, and, as such may be 180 kHz wide in frequency and 1 slot long in time. As an example, a network may allocate a region of resource blocks 3 through 10 (i.e., LCRB=8; RB_start=3). As another example, the network may allocate a region of resource blocks 35 through 50 (i.e., LCRB=16, RB_start=35). Accordingly, variations in LCRB values and RB_start values may determine the region (e.g., resource block allocation region) in which a signal is transmitted.

Each region may be characterized by an MPR value. That is, each region may correspond to an amount by which the maximum power of a transmission may be reduced to comply with the governing specification or regulation. For example, the 3GPP specification defines three distinct regions of resource block allocation: an inner region, an outer region, and an edge region. Some regions (e.g., the inner region) may be closer to the center of a frequency channel and thus may enable a greater power output (e.g., may require a lower MPR of 3 decibels (dB)), while other regions (e.g., the outer region or edge region) may be closer to the edge of a frequency channel and thus may be characterized by more stringent power output restrictions (e.g., may require a higher MPR of 10 dB). However, the regions defined by the specifications and/or regulations (e.g., the 3GPP specification) may not accommodate enhanced transmission power modes, such as "power boost."

In particular, spectral shaping is a technique for shaping an emission signal, generally by applying one or more filters to the emission signal. Spectral shaping of a modulated waveform (e.g., a waveform modulated by a $$\frac{\pi}{2}$$

binary phase-shift Keying (BPSK) shaping filter) reduces peak-to-average power ratio (PAPR) and may enable a power boost (e.g., up to a maximum output power of a transmitter) beyond a nominal power of a certain power class. However, the gain of the power boost may be dependent on or limited by the resource block allocation (e.g., LCRB value and RB_start value). It may be observed that resource block allocation regions that facilitate high power boost (e.g., enable greater transmission power output) overlap with 3GPP regions that require greater MPR restriction (e.g., the outer regions and the edge regions as defined by the 3GPP specification), in addition to regions with lesser MPR restrictions (e.g., the inner regions as defined by the 3GPP specification).

The overlap between allocations that enable power boost and regions of greater MPR restrictions illustrate where transmission power may be increased without significant out-of-channel emission, but is prevented from doing so due to the current 3GPP specification (e.g., Release 17). For example, the user equipment may have a nominal power output capability of 23 decibels (dB) that may be power boosted to 29 dB and operate with a lower MPR restriction of 1 dB when operating in certain resource block allocations without significant out-of-channel emission. However, if the resource block allocations that enable power boost overlaps with the outer regions of the 3GPP specification, and the outer regions have an MPR restriction of 10 dB, the user equipment may be restricted to a maximum power output of 19 dB when the MPR is applied (as opposed to 28 dB); a maximum power output less than the nominal power output. As such, it may be advantageous to define the regions such that power boost may be enabled across resource block allocations facilitating the power boost without applying excessive MPR restrictions as defined under the 3GPP specification.

Embodiments herein provide various techniques to facilitate power boosting for wireless communication devices (e.g., user equipment) by defining more accurate regions for MPR application. This may result in enabling more transmission power for user equipment, without significant out-of-channel emission. The regions may be independent of channel bandwidth and subcarrier spacing, and may be defined using variable parameters based on a number of resource blocks ($N_{RB}$) specified for a certain channel bandwidth, a number or length of contiguous allocated resource blocks (LCRB), and an identification of a resource block at which the allocation begins (RB_start). That is, once the parameters for the regions are established, the parameters may remain effective despite changes to the channel bandwidth and/or subcarrier spacing.

With the foregoing in mind, FIG. 1 is a block diagram of an electronic device (e.g., user equipment) 10, according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
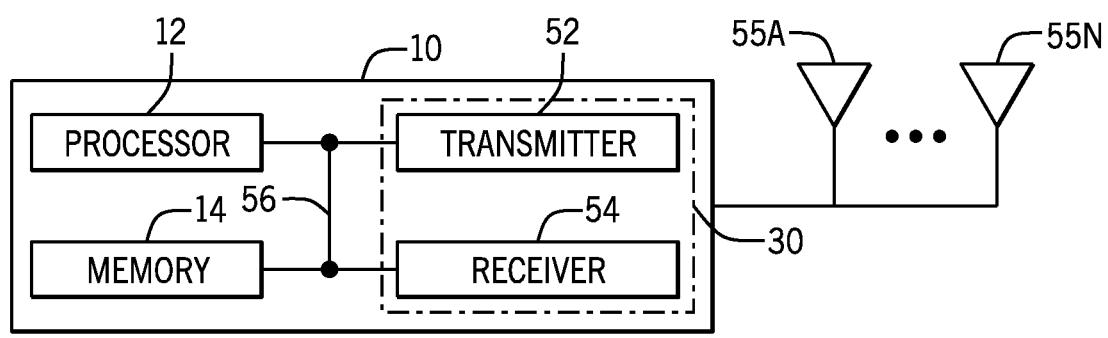
FIG. 2 is a functional block diagram of the user equipment of FIG. 1, according to an embodiment of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
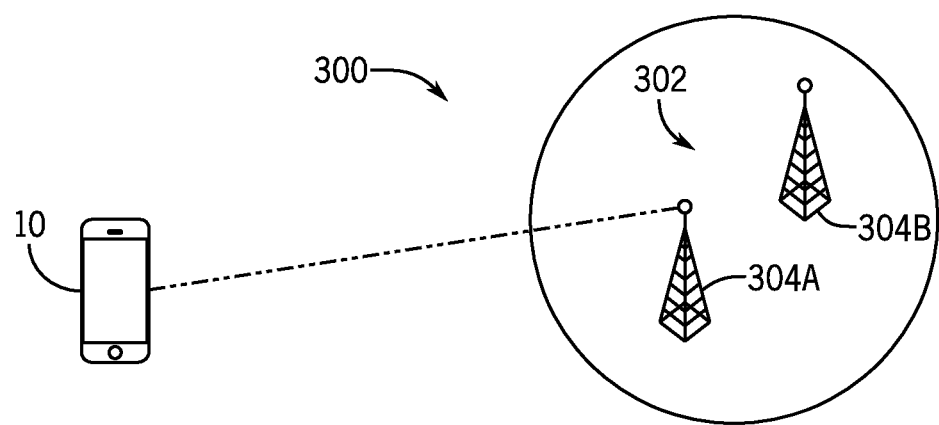
FIG. 3 is a schematic diagram of a communication system including the user equipment of FIG. 1 communicatively coupled to a wireless communication network supported by base stations, according to embodiments of the present disclosure.

FIG. 3 is a schematic diagram of a communication system 300 including the user equipment 10 of FIG. 1 communicatively coupled to a wireless communication network 302 supported by base stations 304A, 304B (collectively 304), according to embodiments of the present disclosure. In particular, the base stations 304 may include Next Generation NodeB (gNodeB or gNB) base stations and may provide 5G/New Radio (NR) coverage via the wireless communication network 302 to the user equipment 10. In some embodiments, the base stations 304 may include Evolved NodeB (eNodeB) base stations and may provide 4G/LTE coverage via the wireless communication network 302 to the user equipment 10. The base stations 304 may include at least some of the components of the user equipment 10 shown in FIGS. 1 and 2, including one or more processors 12, the memory 14, the storage 16, the transmitter 52, and the receiver 54. It should be understood that while the present disclosure may use 5G/NR as an example specification, the embodiments disclosed herein may apply to other suitable specifications (e.g., such as the 4G/LTE specification, beyond 5G/NR specification, and so on). Moreover, the network 302 may include any suitable number of base stations 304 (e.g., one or more base stations 304, four or more base stations 304, ten or more base stations 304, and so on).

Figure 4:
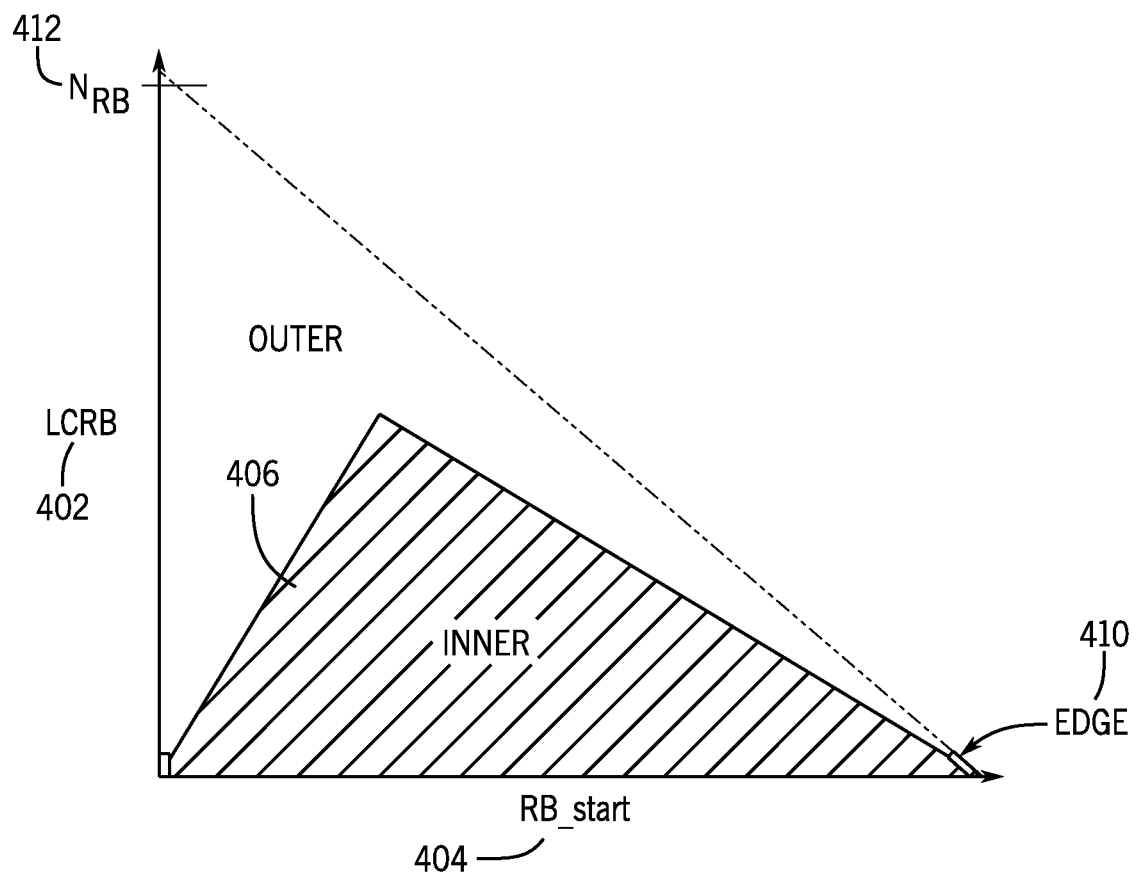
FIG. 4 is a plot illustrating 3GPP-defined resource block allocation regions for a channel.

The network 302 may schedule the user equipment 10 for an uplink transmission by allocating resource blocks to the user equipment 10. The resource block allocation may be defined (e.g., by the 3GPP's Technical Specifications (TS) 38.101-1) into a number of different regions based on certain parameters of the allocation (e.g., a number of resource blocks allocated to the user equipment 10, a resource block at which the allocation begins, and so on). FIG. 4 is a plot illustrating 3GPP-defined resource block allocation regions. The diagram represents a length of contiguous allocated resource blocks (LCRB) 402 along the y-axis and a resource block at which a resource block allocation begins (RB_start) 404 along the x-axis. The greatest value on the y-axis may represent a total number of resource blocks ($N_{RB}$) 412 specified for a certain channel. An inner region 406 may include resource block allocations closer to a center frequency of the channel, an edge region 410 may include resource block allocations closer to an edge of the channel (e.g., bordering out-of-channel frequencies or regions), and an outer region 408 may include resource block allocations closer to the edge of the channel (e.g., but not as close as the edge region 410). FIGS. 5 and 6 below illustrate how transmissions using particular resource block allocations may fall into various regions (e.g., the regions displayed in the 3GPP-defined regions of FIG. 4).

The regions may be defined by the governing specification or regulation. For instance, the inner region 406 may be defined as a resource block allocation including the RB_start 404 having a lowest potential starting point (RB_start, low) equal to max(1, floor(LCRB/2)), where max( ) is a maximum function that returns the largest values of all arguments, and floor(x) is a floor function that returns the greatest integer less than or equal to x. Further, the RB_start 404 of the inner region may have a greatest potential starting point (RB_start, high) equal to $N_{RB}$—RB_start, low—LCRB, where RB_start, low≤RB_start≤RB_start, high and LCRB≤ceil($N_{RB}$/2), where ceil(x) is a ceiling function that returns the smallest integer greater than or equal to x. The edge region 410 may be defined as a resource block allocation including resource blocks allocated at a lowermost edge of a channel and/or an uppermost edge of the channel, where the channel includes an LCRB≤2. The outer region 408 may be defined as a resource block allocation that does not fall within the inner region 406 or the edge region 410.

Each of the inner region 406, the outer region 408, and the edge region 410 may be characterized by an MPR value. That is, each region may correspond to an amount of transmission power by which the maximum power of a transmission may be reduced to comply with the governing specification or regulation (e.g., TS 38.101-1). For example, the inner region 406 may correspond to a smaller MPR restriction (e.g., an MPR of 3 decibels (dB)), the outer region 408 may correspond to a greater MPR restriction (e.g., 6 dB), and the edge region 410 may correspond to a still greater MPR restriction (e.g., 10 dB). This may be because, the higher the transmission power near out-of-channel frequencies (e.g., in the edge region 410 and/or the outer region 408), the higher likelihood of interference with communications occurring on the out-of-channel frequencies. Similarly, for frequencies closer to a center of an allocated channel (e.g., the inner region 406), the less likelihood of interference with communications occurring on the out-of-channel frequencies.

The user equipment 10 may store (e.g., in the memory 14 and/or the storage 16) an MPR lookup table, such that the user equipment 10 may determine the MPR to be applied for each resource block allocation the user equipment 10 receives from the network 302. The network 302 may also store the MPR lookup table, such that the network 302 may allocate resource blocks based on power budget considerations affected by the MPR of the user equipment 10. However, the user equipment 10 may over-apply the MPR to the detriment of transmission quality, such that a higher transmission power may be used without impairing out-of-channel communication. For example, if the user equipment 10 is operating within the outer region 408, the user equipment 10 may back off transmission power by the full 10 dB MPR when the user equipment 10 is triggered to do so (e.g., based on specific absorption rate (SAR) and/or maximum permissible exposure (MPE) standards and regulations). However, while the 3GPP specification may require the full 10 dB MPR, for any allocations falling within the outer region 408, certain resource block allocations in the outer region 408 may be capable of emitting with a lower MPR restriction (e.g., 5 dB) without producing out-of-channel emissions.

FIG. 5 is a diagram of an outer region allocation 500 granted by the network 302 for a channel 501 having a bandwidth 520. The outer region allocation 500 may include an LCRB 522 value of 6 (e.g., the LCRB 522 includes six resource blocks 504, 506, 508, 510, 512, and 514) and may include an RB_start 524 value of 1 (e.g., the index of the first resource block of the LCRB 522, the resource block 504, is 1). For example, if the number of the resource blocks $N_{RB}$ 412 of the channel 501 is 10 (e.g., such that resource block 518 has an index of 9, resource block 516 has an index of 8, and resource block 502 has an index of 0), then the transmissions using the outer region allocation 500, where the LCRB 522=6 and the RB_start 524=1, may fall into the outer region 408, and thus may be subject to the MPR restrictions corresponding to the outer region 408.

Similarly, FIG. 6 is a diagram of an inner region allocation 600 granted by the network 302 for the channel 501 having the bandwidth 520, according to an embodiment of the present disclosure. The inner region allocation 600 may include an LCRB 602 value of 3 (e.g., the LCRB 602 includes resource blocks 510, 512, and 514) and may include an RB_start 604 index of 4 (e.g., the index of the first resource block of the LCRB 602, the resource block 510, is 4). For example, if the number of resource blocks $N_{RB}$ 412 is 10, then the transmissions using inner region allocation 600, where the LCRB 602=3 and the RB_start 604=4, may fall into the inner region 406 and thus may be subject to the MPR restrictions corresponding to the inner region 406.

The outer allocation 500 illustrated in FIG. 5 and the inner allocation 600 illustrated in FIG. 6 are mere examples, and the LCRB 402 and RB_start 404 values corresponding to the inner region 406, the outer region 408, and the edge region 410 may vary depending on the definitions of the governing standard or regulation. Further, the allocations corresponding to the inner region 406, the outer region 408, and the edge region 410 may vary depending on the $N_{RB}$ 412 of the allocated channel 501. The $N_{RB}$ 412 may be any suitable number, such as 10, 20, 100, 1000, and so on, depending on what is allocated by the network 302.

Applying certain governing regulations and/or specifications (e.g., TS 38.101-1) related to MPR may be disadvantageous for a number of reasons. For example, applying MPR per the 3GPP-defined regions of FIG. 4 may reduce or negate the user equipment's 10 ability to apply enhanced emission output power, referred to herein as "power boost." The user equipment 10 may perform power boost by applying a shaping filter to shape a modulated waveform (e.g., $$\frac{\pi}{2}$$

BPSK modulated waveform) and increase the output power of the transmitter 52 of the user equipment 10 beyond a nominal power of a certain power class. However, the amount of power decreased (e.g., the MPR) from applying the power boost may be dependent on the resource blocks allocated from the network 302 to the user equipment 10 (e.g., LCRB 402 value and RB_start 404 value).

Figure 7:
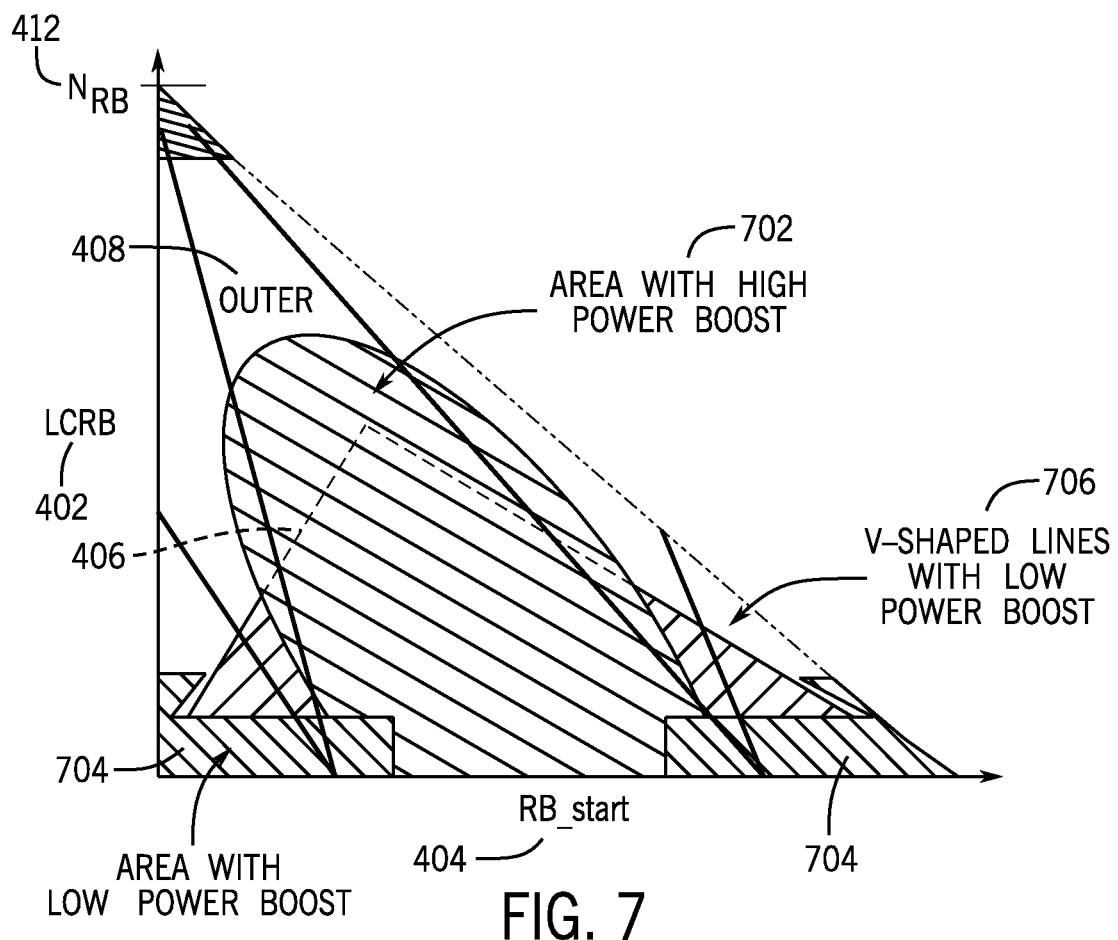
FIG. 7 is a plot of resource block allocation regions that facilitate transmission power boost (in relation to the 3GPP-defined regions discussed in FIG. 4), according to embodiments of the present disclosure.

The resource block allocations that facilitate power boost may overlap with current 3GPP-defined regions (e.g., the outer region 408 and/or the edge region 410) that correspond to greater MPR restrictions, which may reduce or negate the ability to provide higher transmission power. FIG. 7 and the accompanying discussion below will assist in clarifying the disadvantages of the region definitions depicted in FIG. 4.

FIG. 7 is a plot of resource block allocation regions that facilitate transmission power boost (in relation to the 3GPP-defined regions discussed in FIG. 4), according to an embodiment of the present disclosure. FIG. 7 may include regions characterized by low MPR (e.g., the high power boost region 702) and regions characterized by higher MPR (e.g., low power boost regions 704 and 706). As previously stated, applying power boost may enable the user equipment 10 to boost the output power of the transmitter 52 beyond a nominal power. For example, the user equipment 10 may be capable of a maximum power output of 23 decibels (dB) in a standard (e.g., non-power boost) region. By applying power boost, the user equipment 10 may instead transmit a signal at a maximum power output of 29 dB.

However, as may be observed in FIG. 7, the power boost regions 702, 704 and 706 overlap with the inner region 406, as well as the outer region 408 and the edge region 410. Recalling that, as previously discussed, the inner region 406, the outer region 408, and the edge region 410 each correspond to different MPR restrictions, the high power boost region 702 may not be effectively used or maximized in terms of transmission power as portions of the high power boost region 702 overlap with the outer region 408 (for which higher MPR restrictions are prescribed). For example, if the user equipment 10 receives a resource block allocation within the high power boost region 702, the user equipment 10 may be capable of increasing its maximum power output to 29 dB. If, however, the allocation also falls within the outer region 408, the 3GPP standard may be required to apply an MPR of 6 dB. The power boost of 6 dB enabled by the high power boost region 702 may be negated by the 6 dB MPR required for signals in the outer region 408. As such, the 3GPP-defined resource block region definitions may reduce or negate the power boost capabilities enabled by the power boost regions 702, 704, and 706.

Figure 8:
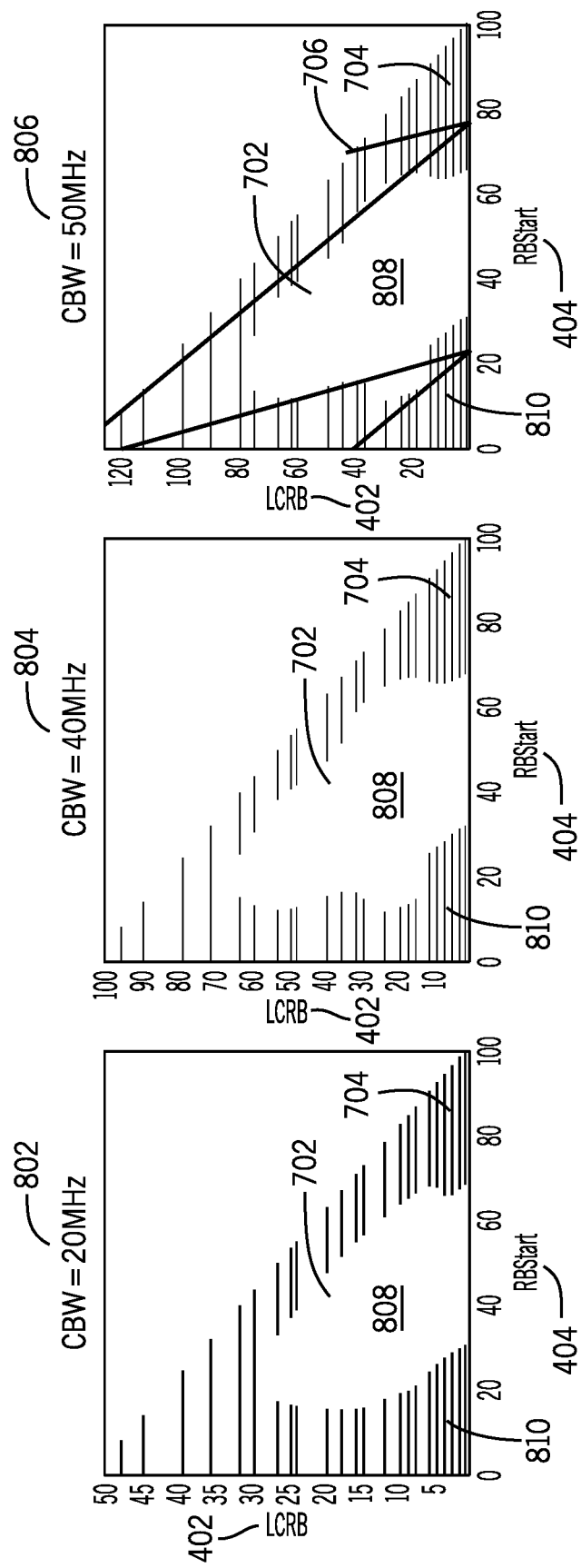
FIG. 8 is a set of grayscale plots showing resource block allocation regions that facilitate transmission power boost for different channel bandwidths, according to embodiments of the present disclosure.

FIG. 8 is a set of grayscale plots showing resource block allocation regions (e.g., 702, 704, and 706) that facilitate transmission power boost for different channel bandwidths, according to an embodiment of the present disclosure. FIG. 8 includes a simulation of maximum output power capability of the user equipment 10 for a channel having a channel bandwidth of 20 megahertz (MHz) (e.g., a 20 MHz simulation 802) without impairing out-of-channel communication, a simulation of maximum output power capability of the user equipment 10 for a channel having a channel bandwidth of 40 MHz (e.g., a 40 MHz simulation 804) without impairing out-of-channel communication, and a simulation of maximum output power capability of the user equipment 10 for a channel having a channel bandwidth of 50 MHz (e.g., a 50 MHz simulation 806) without impairing out-of-channel communication.

For each of the 20 MHz simulation 802, the 40 MHz simulation 804, and the 50 MHz simulation 806, the darker portions 808 (e.g., the high power boost region 702) of the grayscale plot represent areas of greater power boost capability and the lighter portions 810 (e.g., the low power boost regions 704 and 706) of the grayscale plot represent areas of lower power boost capability. The high power boost region 702 present in the 20 MHz simulation 802, the 40 MHz simulation 804, and the 50 MHz simulation 806 may be due to resource block allocations corresponding to the high power boost region 702 being closer to the center frequency of each channel (e.g., further away from the channel edges, and thus less likely to produce out-of-channel emissions) and spectral shaping of a modulated waveform, as spectral shaping may reduce peak-to-average power ratio (PAPR) and may enable a power boost (e.g., up to a maximum output power of a transmitter) beyond a nominal power of a certain power class.

As may be observed, for each of the 20 MHz simulation 802, the 40 MHz simulation 804, and the 50 MHz simulation 806, the high power boost region 702 has a similar shape (e.g., the high power boost region 702 corresponds to the same or similar allocations for each of the channel bandwidths). However, in the 50 MHz simulation 806, certain features may become more clearly defined. For example, the low power boost region 706 is more visible in the 50 MHz simulation 806 than at the 40 MHz simulation 804 or the 30 MHz simulation 802.

Figure 9:
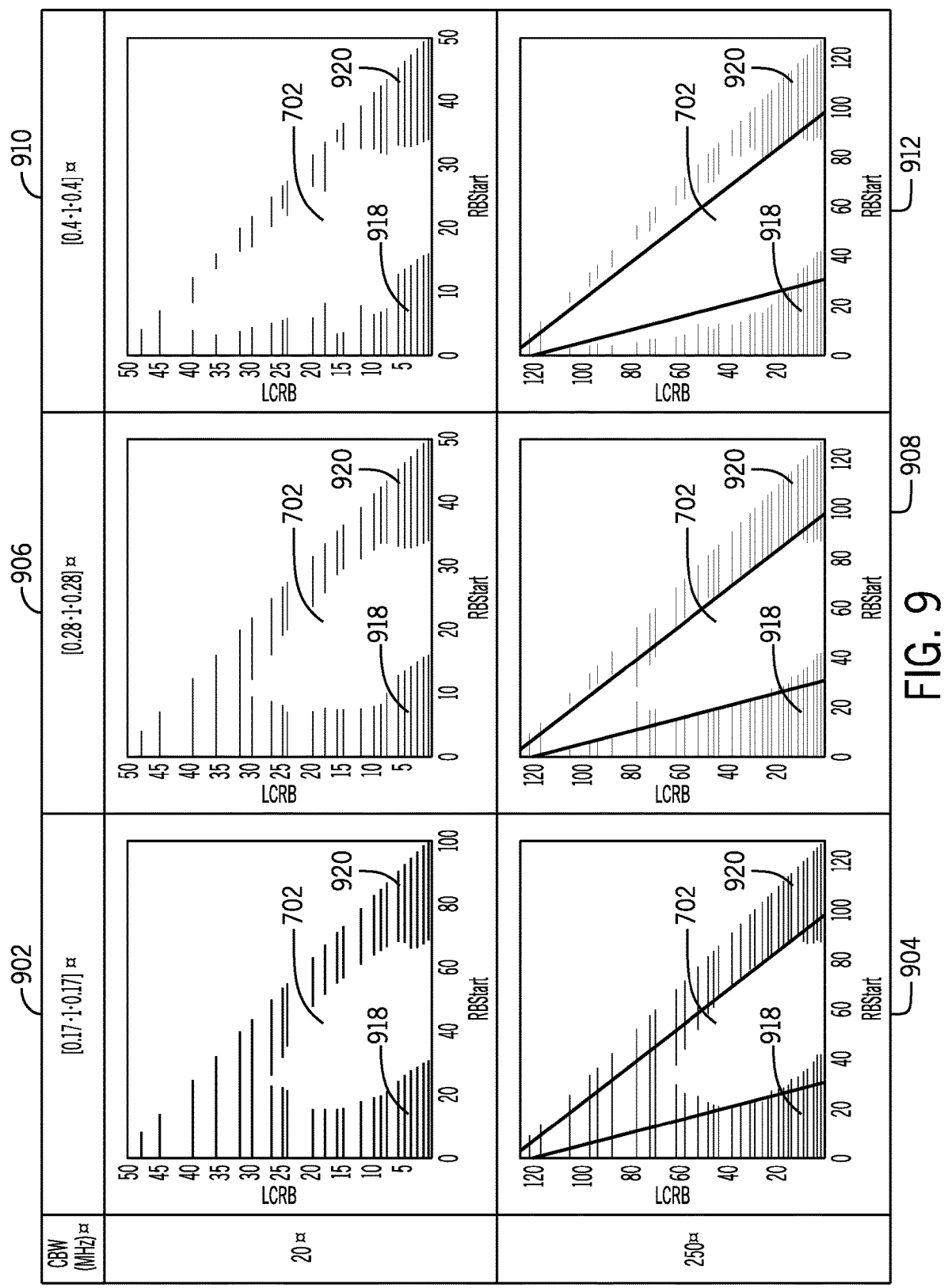
FIG. 9 is a set grayscale plots showing resource block allocation regions that facilitate transmission power boost for different spectral shaping filters at different channel bandwidths, according to embodiments of the present disclosure.

FIG. 9 is a set grayscale plots showing resource block allocation regions (e.g., 702, 704, and 706) that facilitate transmission power boost for different spectral shaping filters with $$\frac{\pi}{2}$$

BPSK modulated waveform at different channel bandwidths, according to an embodiment of the present disclosure. The available power boost of an individual resource block allocation may generally be dependent on the shaping filter that is applied to the resource block allocation. For certain resource block allocations, applying a more aggressive filter may increase the amount of available power boost. As shown, the shaping filters applied to the resource block allocations are increasingly aggressive. That is, the shaping filter having coefficient [0.17 1 0.17] (e.g., where the first 0.17 indicates a front end weighting of the waveform amplitude by 0.17, the 1 indicates that the main weight is at the middle of the filter, and the second 0.17 indicates a back end weighting of the waveform amplitude by 0.17), applied to simulation 902 is the least aggressive, and the shaping filter having filter coefficient [0.4 1 0.4] is the most aggressive. As may be observed from the 20 MHz simulations 902, 906, and 910, the high power boost region 702 becomes larger as more aggressive filters are applied. As may be observed from the 50 MHz simulations 904, 908, and 912, the high power boost region 702 becomes larger and the low power boost region 706 becomes more defined the more aggressive the filter.

It should be noted that certain resource block allocations may not be included for applying certain filters, such as more aggressive shaping filters. For example, applying the aggressive filters in simulations 906 and 910 may cause the resource block allocations 918 and 920 to reduce in size or disappear altogether. Accordingly, it may be more advantageous to utilize an intermediate shaping filter (the shaping filter having coefficient [0.28 1 0.28] applied to simulation 906) to clearly identify resource block allocations for which MPR may be decreased or optimized.

Figure 10:
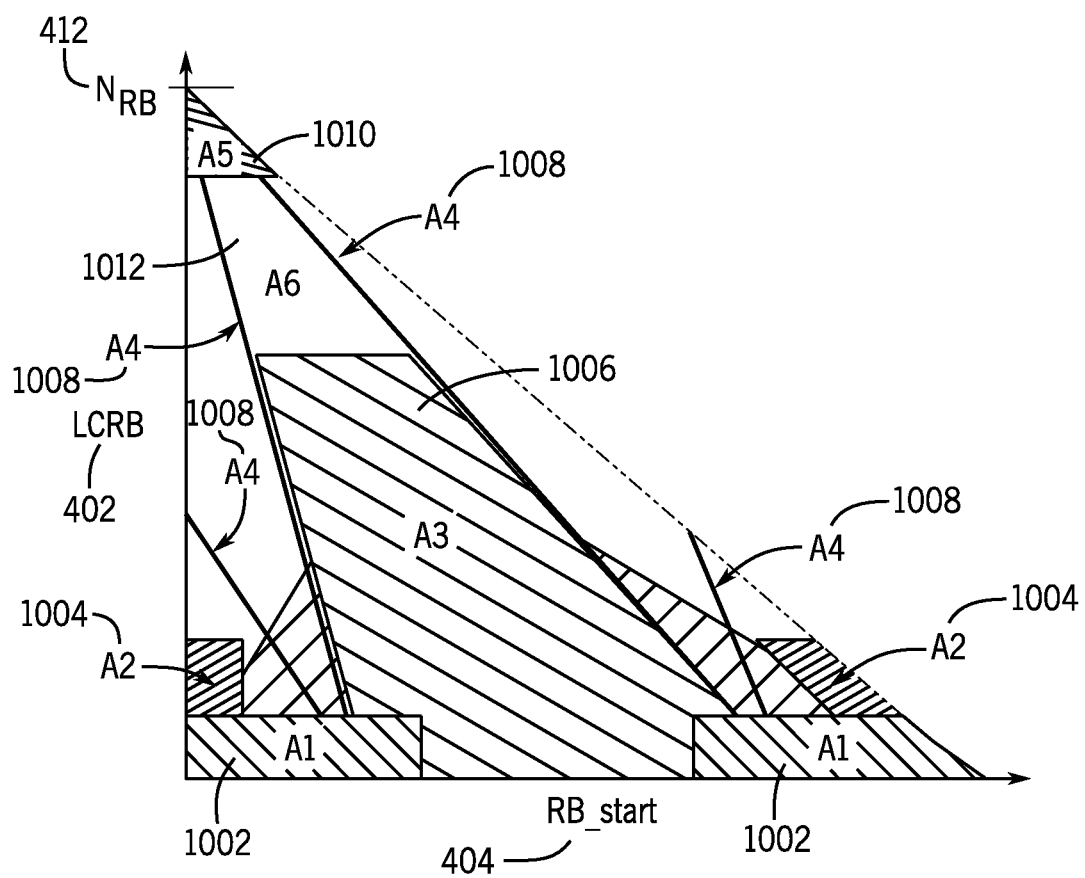
FIG. 10 is a plot of parameterized resource block allocation regions that facilitate transmission power boost, according to embodiments of the present disclosure.

Based on the behavior observed in the resource block allocations with respect to channel bandwidth and shaping filters discussed in FIG. 8 and FIG. 9, distinct regions for which MPR may be more accurately tuned may be identified. The regions may facilitate increasing or maximizing the available power boost (e.g., decreasing or minimizing MPR) independent of channel bandwidths, subcarrier spacing, and shaping filter coefficients. With this in mind, FIG. 10 is a plot of parameterized resource block allocation regions that facilitate transmission power boost, according to an embodiment of the present disclosure. As illustrated, FIG. 10 depicts six regions: A1 region 1002, A2 region 1004, A3 region 1006, A4 region 1008, A5 region 1010, and A6 region 1012.

The regions depicted in FIG. 10 may enable increasing or maximizing available power boost (e.g., decreasing or minimizing MPR) by identifying the resource block allocations that enable maximum output power capability of the user equipment 10 without impairing out-of-channel communication. As previously discussed in FIG. 7, the resource block allocations corresponding to the regions defined in certain governing specifications (e.g., 3GPP TS 38.101-1) may not be complete and/or accurate in relation to the resource block allocations that enable high power boost (e.g., correspond to low MPR restrictions). As such, certain resource block allocations (e.g., resource block allocations falling within the outer region 408 and/or the edge region 410) may be capable of enabling high power boost (e.g., low MPR), but are instead characterized by low power boost (e.g., high MPR) due to MPR restrictions imposed by the governing specifications. As a result, under the governing specifications, the power boost capabilities of the user equipment 10 may be decreased or negated.

The regions dictating MPR restriction requirements may be defined so as to increase or maximize power boost (e.g., decrease or eliminate excessive MPR restrictions) without impairing out-of-channel emissions and while being independent with respect to channel bandwidth and subcarrier spacing. That is, the regions may be applicable no matter what channel bandwidth and subcarrier spacing the application (e.g., the regions may be fixed or may not change when varying channel bandwidth and/or subcarrier spacing).

For example, the A3 region 1006 and the A1 region 1002 may enable power boost (e.g., a maximum power output increase of 6 dB, for a total maximum power output of 29 dB). The A3 region 1006 may be characterized by an MPR restriction of 1 dB, enabling the user equipment 10 to transmit signals in the A3 region 1006 with an output power of 28 dB after the MPR is applied. The A1 region 1002 may be characterized by an MPR restriction of 5 dB, enabling the user equipment 10 to transmit signals in the A1 region 1002 with an output power of 24 dB after the MPR is applied. Accordingly, by using the region definitions depicted in FIG. 10, the available power boost may be increased or maximized (e.g., when compared to the regions dictated by the current 3GPP specification).

The network 302 may allocate resource blocks to the user equipment 10 based on transmission power considerations. Specifically, the network 302 may allocate resource blocks to the user equipment 10 based on the distance between the user equipment 10 and the base station 304A and/or the base station 304B. For example, if the user equipment 10 is near the base station 304A, the network may allocate to the user equipment 10 resource blocks corresponding to a low power boost region (e.g., a region characterized by high MPR), as the user equipment 10 is near to the base station 304A and thus the user equipment 10 may be capable of communicating with the base station 304A using reduced transmission power. However, if the user equipment 10 is far from the base station 304A (e.g., near a cell edge of the base station 304A), the network may allocate to the user equipment 10 resource blocks corresponding to a high power boost region (e.g., a region characterized by low MPR) and may enable the user equipment 10 (e.g., by sending an enable signal or other indication to use a power boost mode) to use a power boosted transmission signal to effectively communicate with the base station 304A.

The user equipment 10 may receive and store (e.g., in the memory 14 and/or the storage 16) an updated MPR lookup table (e.g., an MPR lookup table mapped to the regions depicted in FIG. 10), such that the user equipment 10 may determine the amount of MPR that is required for each resource block allocation the user equipment 10 receives from the network 302. The network 302 may also store the updated MPR lookup table, such that the network 302 may grant certain allocations based on power budget considerations affected by the MPR of the user equipment 10.

Each of the regions depicted in FIG. 10 may be based on parameterized conditions defined by the following equations or relationships. Because of the parameterized conditions, which may define what MPR to apply for the associated regions, the regions may be fine-tuned for various channel bandwidths, subcarrier spacing, and shaping filter coefficients. It should be noted that the parameter values described below are mere examples, and the exact parameter values may change (e.g., depending on shaping filters that may be used or applied). However, the conditions and parameters can be described independently of channel bandwidths and subcarrier spacing and to some extent also for various shaping filters. This means that there is no inherent need to adjust parameter setup when bandwidth and subcarrier spacing is changed and a single parameter set can be sufficient. For example, for certain bandwidths, subcarrier spacing, and shaping filters, parameters for each of the regions depicted in FIG. 10 are as follows:

| Parameter | Parameter Value |
|---|---|
| $c0$ | 6 |
| $c1$ | $\text{ceil}(N_{RB}/3)$ |
| $c2$ | $\text{ceil}(N_{RB}/20)$ |
| $c3$ | $\text{ceil}(N_{RB}/8)$ |
| $c4$ | 0.25 |
| $c5$ | 0.75 |
| $c6$ | 3 |
| $c7$ | 3 |
| $c8$ | $c1 + 4$ |
| $c9$ | $\text{floor}(N_{RB}/2)$ |
| $c10$ | $N_{RB} - 3$ |
| $c11$ | 0.25 |
| $c12$ | 0.75 |
| $c13$ | 4 |
| $c14$ | $\text{ceil}(N_{RB}/10)$ |

The regions depicted in FIG. 10 may be defined using parameter values (e.g., the values included in the table above) as follows: The A1 region 1002 may include two sections and may be defined as: $RB\_start \leq c1$; and $RB\_start \geq N_{RB} - c8$; where $LCRB \leq c0$.

The A2 region 1004 may include two sections and may be defined as:

$$RB\_start \leq c2; \text{ and}$$

$$RB\_start \geq N_{RB} - LCRB - c2;$$

where $0 \leq LCRB \leq c3$.

If $c14 < LCRB < 9$, the A3 region 1006 may be defined as:

$$\text{floor}(N_{RB}*c11 - LCRB*c5 - c6 + c7) < RB\_start < \text{floor}(N_{RB}*c12 - LCRB*c5 + c13 - c6).$$

If $LCRB \leq c14$, the A3 region 1006 may be defined as:

$$c1 < RB\_start < N_{RB} - c8.$$

The A4 region 1008 may include four sections and may be defined as:

$$\text{floor}(N_{RB}*c11 - LCRB*c5 - c6) \leq RB\_start \leq \text{floor}(N_{RB}*c11 - LCRB*c5 - c6 + c7);$$

$$\text{floor}(N_{RB}*c11 - LCRB*c4 - c6) \leq RB\_start \leq \text{floor}(N_{RB}*c11 - LCRB*c4 - c6 + c7);$$

$$\text{floor}(N_{RB}*c12 - LCRB*c5 + c13 - c6) \leq RB\_start \leq \text{floor}(N_{RB}*c12 - LCRB*c4 + c13 - c6 + c7);$$

$$\text{floor}(N_{RB}*c12 - LCRB*c4 + c13 - c6) \leq RB\_start \leq \text{floor}(N_{RB}*c12 - LCRB*c4 + c13 - c6 + c7);$$

where $c0 < LCRB < c10$.

The A5 region 1010 may be defined as $LCRB \geq c10$.

The A6 region 1012 may be defined as any resource block allocation which is not part of the A1 region 1002, the A2 region 1004, the A3 region 1006, the A4 region 1008, or the A5 region 1010.

Figure 11:
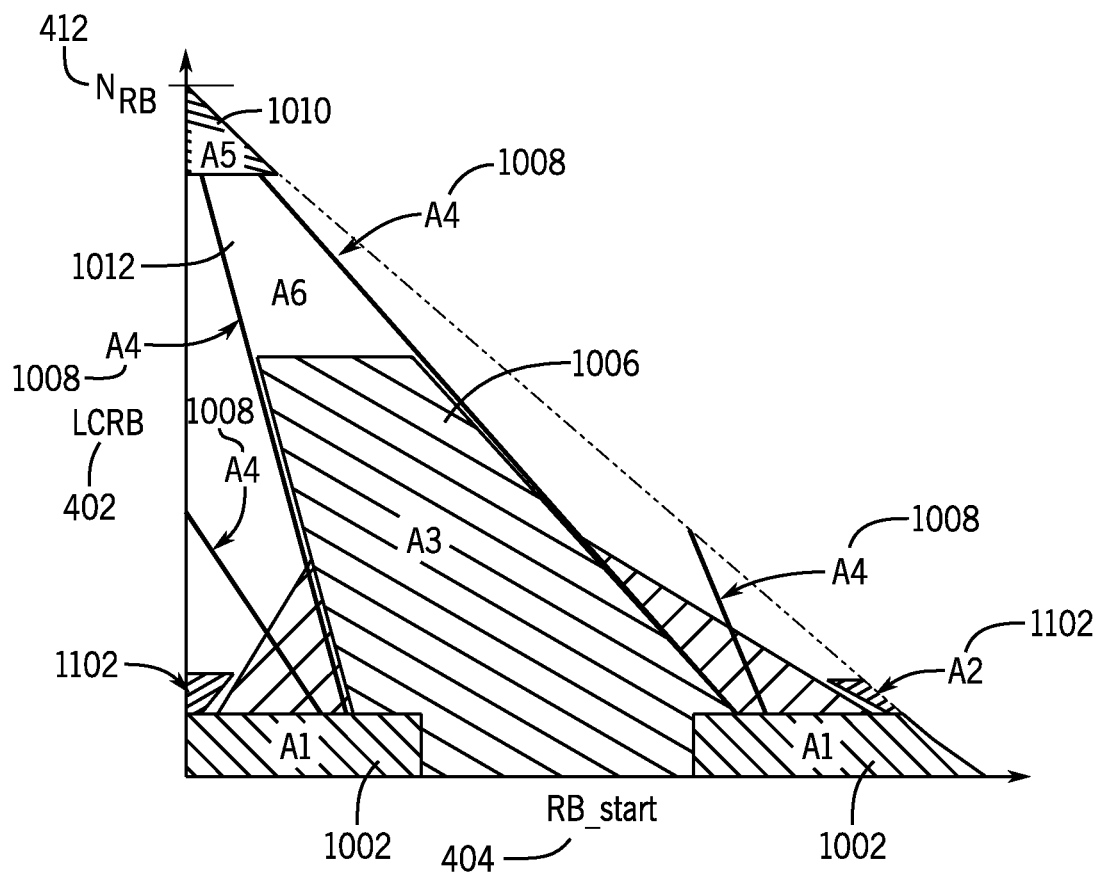
FIG. 11 is the plot depicted in FIG. 10 with a modified resource block allocation region, according to embodiments of the present disclosure.

The region definitions of the regions depicted in FIG. 10 may be modified in a number of ways. For example, it may be that certain regions may be excluded if the certain regions overlap with another region (e.g., the A4 region 1008 may be excluded if the A4 region 1008 overlaps with the A2 region 1004). Further, the region definitions may be modified to adjust the shapes of the regions. For example, FIG. 11 is a diagram similar to the diagram depicted in FIG. 10 with a modified A2 region 1102, according to an embodiment of the present disclosure.

The modified A2 region may include two sections, and may be defined as:

$c0+RB\_start<LCRB \leq c3; c0+(N_{RB}-LCRB-RB\_start)$
$<LCRB<c3.$

The shape of the modified A2 region 1102 may enable more efficient coverage of low power boost resource block allocations corresponding to the A2 region 1102 compared to the shape of the modified A2 region 1004 depicted in FIG. 10. As such, the region definitions and/or the parameter values used in the region definitions may be modified to provide increased or maximized coverage of resource block allocations that enable power boost (e.g., corresponding to resource block allocations characterized by low MPR). In addition to excluding overlapping regions and/or reshaping the regions, the regions may be repositioned, removed entirely, and/or new regions may be added.

Figure 12:
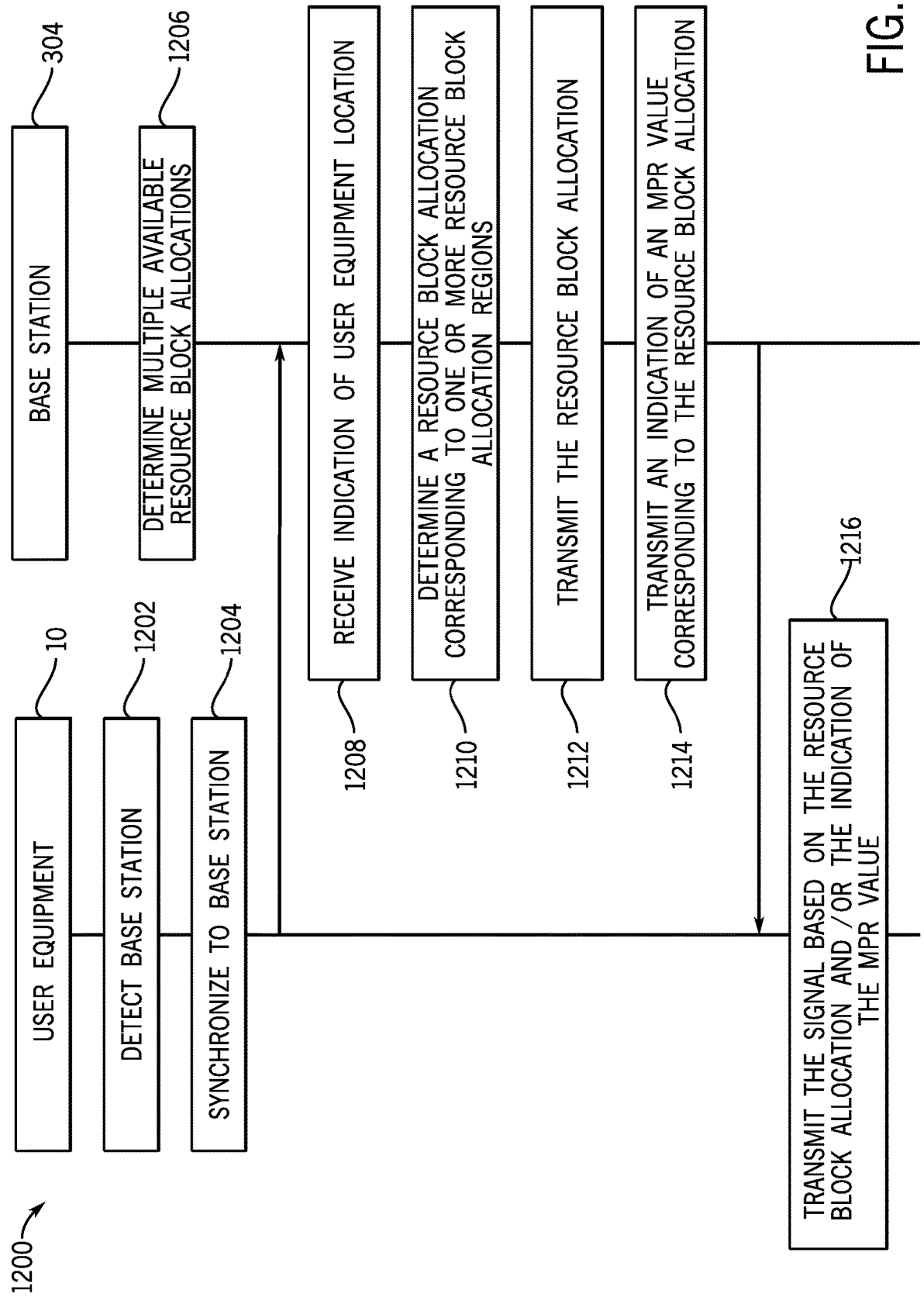
FIG. 12 is a flowchart of a method for determining a resource block allocation of the resource block allocation regions, providing the resource block allocation to the user equipment, and enabling the user equipment to communicate with the base station based on the resource block allocation, according to embodiments of the present disclosure.

FIG. 12 is a flowchart of a method 1200 for determining a resource block allocation of the resource block allocation regions, providing the resource block allocation to the user equipment 10, and enabling the user equipment 10 to communicate with the base station 304 based on the resource block allocation, according to an embodiment of the present disclosure. Any suitable device (e.g., a controller) that may control components of the user equipment 10, such as the processor 12, may perform the method 1200. In some embodiments, the method 1200 may be implemented by executing instructions stored in a tangible, non-transitory, computer-readable medium, such as the memory 14 or storage 16, using the processor 12. For example, the method 1200 may be performed at least in part by one or more software components, such as an operating system of the user equipment 10, one or more software applications of the user equipment 10, and the like. While the method 1200 is described using steps in a specific sequence, it should be understood that the present disclosure contemplates that the described steps may be performed in different sequences than the sequence illustrated, and certain described steps may be skipped or not performed altogether.

In process block 1202, the user equipment 10 determines or detects one or more base stations 306. In process block 1204, the user equipment 10 synchronizes to the base station 306 (e.g., by aligning the timing of the user equipment 10 to the timing of the base station 306). In process block 1206, the base station 306 determines multiple available resource block allocations. The base station 306 may continuously or periodically monitor resource block allocations for multiple channels to determine which resource block allocations are available or which are being used to schedule other devices connected to a network. In some embodiments, a network may determine the multiple available resource block allocations and transmit the available resource block allocations to the base station 306. In process block 1208 the base station 306 receives an indication of a location of the user equipment 10. The location may be determined by the user equipment 10 itself (e.g., via global navigation satellite system (GNSS) location services) and/or by the base station 306 (e.g., based on an indication of signal strength or quality between the user equipment 10 and the base station 306).

In process block 1210, the base station 306 determines a resource block allocation corresponding to one or more resource block allocation regions. For example, the base station 306 may schedule the resource block allocation based on the location of the user equipment 10 determined in the process block 1210. If the base station 306 determines that the user equipment 10 is in close proximity (e.g., below a distance threshold) to the base station, the base station 306 may schedule a resource block allocation corresponding to a low power boost region (e.g., A1 1002). If the base station 306 determines that the user equipment 10 is a greater distance away from the base station 306 (e.g., toward the edge of the network 302), the base station 306 may schedule a resource block allocation corresponding to a high power boost region (e.g., the region A3 1006), as operating in a power boost region (e.g., with corresponding low MPR restrictions) may be useful in establishing a high quality network connection (e.g., a signal including a signal-to-noise ratio below a threshold).

In process block 1212, the base station 306 transmits the resource block allocation corresponding to one or more of the resource block allocation regions to the user equipment 10. In process block 1214, the base station 306 transmits an indication of an MPR value corresponding to the resource block allocation. For example, the base station 306 may store multiple MPR values corresponding to multiple resource block allocation regions in a data structure, such as a lookup table, and transmit the data structure to the user equipment 10. In process block 1216, the user equipment 10 transmits the signal based on the resource block allocation and/or the indication of the MPR value. If the base station 306 schedules the resource block allocation, the user equipment 10 may reference the indication of the MPR value (e.g., stored in the data structure) to determine how much output power should be applied (or reduced) when transmitting the signal. In this manner, the flowchart 1200 determines a resource block allocation of the resource block allocation regions, provides the resource block allocation to the user equipment 10, and enables the user equipment 10 to communicate with the base station 304 based on the resource block allocation.

An embodiment includes a base station, the base station including a receiver, a transmitter, and processing circuitry communicatively coupled to the receiver and the transmitter. The processing circuitry may determine a plurality of resource block allocation regions; determine a plurality of available resource block allocations; receive, via the receiver, an indication of user equipment; determine a location of the user equipment; determine a resource block allocation of the plurality of the resource block allocation regions based on the location; transmit, via the transmitter, a first indication of the resource block allocation; and transmit, via the transmitter, a second indication of a maximum power reduction value corresponding to the resource block allocation, wherein the user equipment is configured to transmit a signal in a power boost mode based on the first indication and the second indication.

The resource block allocation region is defined by a spectral shaping filter, a length of contiguous allocated resource blocks of the resource block allocation, and a starting resource block of the resource block allocation.

The processing circuitry of the base station may determine a first resource block allocation corresponding to a high power boost region based on the location indicating a distance from the user equipment above a distance threshold, and transmit the first resource block allocation to the user equipment to enable the user equipment to transmit the signal in the high power boost region. The processing circuitry of the base station may determine a second resource block allocation corresponding to a low power boost region based on the location indicating a distance from the user equipment below the distance threshold, and transmit the second resource block allocation to the user equipment to enable the user equipment to transmit the signal in the low power boost region.

The processing circuitry of the base station may determine the plurality of resource block allocation regions by determining a plurality of parameterized conditions that define the plurality of resource block allocation regions independent of channel bandwidth, subcarrier spacing, a shaping filter coefficient, or any combination thereof.

The user equipment transmit a signal in the power boost mode by applying a shaping filter to shape a $$\frac{\pi}{2}$$

binary phase shift keying modulated waveform.

At least one resource block allocation region determined by the base station may overlap with an inner resource block allocation region and an outer resource block allocation region as defined by a $3^{rd}$ Generation Partnership Project specification The plurality of resource block allocation regions includes at least four resource block allocation regions.

In an embodiment, a method may include receiving, using a receiver of a base station, a first indication of user equipment within a cell of the base station; receiving, via processing circuitry of the base station, a second indication of a distance between the user equipment and the base station; determining, via the processing circuitry, a plurality of resource block allocation regions; determining, via the processing circuitry, a resource block allocation of the plurality of resource block allocation regions to provide to the user equipment based on the distance; and transmitting, using a transmitter of the base station, a third indication of the resource block allocation to the user equipment, at least a portion of the resource block allocation enabling the user equipment to transmit a signal in a power boost mode.

The resource block allocation is based on a determined transmit power of the user equipment, the determined transmit power being based on the distance between the user equipment and the base station.

The method further including determining, via the processing circuitry, a plurality of maximum power reduction values corresponding to the plurality of resource block allocation regions; storing, via the processing circuitry, the plurality of maximum power reduction values; and transmitting, using the transmitter, a fourth indication of the plurality of maximum power reduction values to the user equipment to enable the user equipment to apply a maximum power reduction value of the plurality of maximum power reduction values to a resource block allocation region of the plurality of resource block allocation regions.

The plurality of resource block allocation regions are based on a plurality of parameterized conditions, the plurality of parameterized conditions defining the plurality of resource block allocation regions independent of channel bandwidth, subcarrier spacing, and shaping filter coefficient.

The method, further including determining, via the processing circuitry, that a first region of the plurality of resource block allocation regions overlaps a second region of the a plurality of resource block allocation regions; determining, via the processing circuitry, that the first region enables the user equipment to transmit a signal in the power boost mode; and refraining, via the processing circuitry, from selecting a resource block allocation corresponding to the second region.

A region of the plurality of resource block allocation regions includes a first resource block including an index of less than or equal to a ceiling function of a total number of resource blocks for a given channel bandwidth divided by 3 and greater than or equal to a difference of the total number of resource blocks for the given channel bandwidth and a sum of 4 and the ceiling function of the total number of resource blocks for the given channel bandwidth divided by 3, and a number of contiguous resource blocks comprising a length greater than or equal to 6.

A region of the plurality of resource block allocation regions includes a number of contiguous resource blocks comprising a length less than or equal to 14, and a first resource block comprising an index greater than a ceiling function of a total number of resource blocks for a given channel bandwidth divided by 3 and less than a difference of the total number of resource blocks for the given channel bandwidth and a sum of 4 and the ceiling function of the total number of resource blocks for the given channel bandwidth divided by 3.

In an embodiment, a tangible, non-transitory computer-readable medium including computer-readable instructions that, when executed by one or more processors, cause the one or more processors to determine a plurality of resource block allocation regions; determine an available resource block allocation, the available resource block allocation corresponding to at least one of the plurality of the resource block allocation regions; and transmit a first indication of the available resource block allocation to user equipment, wherein transmitting the available resource block allocation causes the user equipment to transmit a signal in a power boost mode.

The tangible, non-transitory computer-readable medium, wherein the computer-readable instructions, when executed by one or more processors, cause the one or more processors to receive a second indication of a location of the user equipment; determine a distance from the user equipment based on the indication of the location; and transmit a third indication of the available resource block allocation based on the determined distance from the user equipment.

The plurality of resource block allocation regions are defined by a spectral shaping filter, a length of contiguous allocated resource blocks of a resource block allocation, and a starting resource block of the resource block allocation.

The tangible, non-transitory computer-readable medium, wherein the computer-readable instructions, when executed by one or more processors, cause the one or more processors to transmit a second indication of a maximum power reduction value corresponding to the resource block allocation; and cause the user equipment to decrease output power of the signal based on the maximum power reduction value.

The available resource block allocation includes a first resource block comprising an index less than or equal to a ceiling function of a total number of resource blocks for a given channel bandwidth divided by 20, and the first resource block comprising the index greater than or equal to the total number of resource blocks subtracted by a number of contiguous resource blocks subtracted from the ceiling function of the total number of resource blocks for the given channel bandwidth divided by 20.

The number of contiguous resource blocks is greater than 0 and less than or equal to a ceiling function of the total number of resource blocks for the given channel bandwidth divided by 8.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. User equipment, comprising:
  a receiver;
  a transmitter; and
  processing circuitry communicatively coupled to the receiver and the transmitter, the processing circuitry configured to
    receive, via the receiver, a first indication of a resource block allocation from a base station, the resource block allocation corresponding to one or more resource block allocation regions of at least four resource block allocation regions, each resource block allocation region of the at least four resource block allocation regions corresponding to a different maximum power reduction value, and
    transmit a signal, via the transmitter, based on the resource block allocation while operating in a power boost mode corresponding to a high power boost region of the at least four resource block allocation regions, the high power boost region comprising
      a number of contiguous resource blocks comprising a length less than or equal to a ceiling function of a total number of resource blocks for a given channel bandwidth divided by 10, and
      a first resource block comprising an index greater than a ceiling function of the total number of resource blocks for the given channel bandwidth divided by 3 and less than a difference of the total number of resource blocks for the given channel bandwidth and a sum of 4 and the ceiling function of the total number of resource blocks for the given channel bandwidth divided by 3.

2. The user equipment of claim 1, wherein the processing circuitry is configured to increase power for transmitting the signal based on the power boost mode, and decrease the power for transmitting the signal based on a maximum power reduction value corresponding to the resource block allocation.

3. The user equipment of claim 1, wherein each resource block allocation region of the four resource block allocation regions is defined by a length of contiguous allocated resource blocks of the resource block allocation and a starting resource block of the resource block allocation.

4. The user equipment of claim 1, wherein at least one resource block allocation region overlaps with an inner resource block region and an outer resource block region as defined by a 3rd Generation Partnership Project specification.

5. The user equipment of claim 4, wherein the inner resource block region corresponds to a first maximum power reduction value and the outer resource block region corresponds to a second maximum power reduction value, the second maximum power reduction value greater than the first maximum power reduction value.

6. The user equipment of claim 1, wherein the processing circuitry is configured to receive, via the receiver, a second indication to operate in the power boost mode from the base station, and cause the transmitter to operate in the power boost mode based on the second indication.

7. The user equipment of claim 1, wherein the at least four resource block allocation regions include six resource block allocation regions corresponding to six different maximum power reduction values.

8. The user equipment of claim 1, comprising a memory configured to store a plurality of maximum power reduction values corresponding to the at least four resource block allocation regions.

9. A method, comprising:
  detecting a first indication of a base station;
  synchronizing to the base station;
  sending, to the base station, a second indication of a distance from the base station;
  receiving, from the base station, a third indication of a resource block allocation based on a plurality of resource block allocation regions and a fourth indication of a maximum power reduction value corresponding to the resource block allocation based on the second indication of the distance; and
  transmitting a signal in a high power boost region based on the fourth indication of the maximum power reduction value, the high power boost region comprising
    a number of contiguous resource blocks comprising a length less than 9 and greater than a ceiling function of a total number of resource blocks for a given channel bandwidth divided by 10,
    a first resource block greater than a floor function of a quotient of the total number of resource blocks divided by four subtracted by a product of the number of contiguous resource blocks and 0.75, subtracted by 3.75, and
    the first resource block is less than a floor function of product of the total number of resource blocks and 0.75 subtracted by the number of contiguous resource blocks multiplied by 0.75 and added to 1.

10. The method of claim 9, wherein transmitting the signal comprises transmitting the signal using a $\pi/2$ binary phase-shift keying spectral shaping filter.

11. The method of claim 9, wherein transmitting the signal in the high power boost region based on the fourth indication of the maximum power reduction value comprises applying an amount of power back-off corresponding to the maximum power reduction value.

12. The method of claim 9, comprising receiving a plurality of maximum power reduction values corresponding to the plurality of resource block allocation regions, the plurality of maximum power reduction values comprising the maximum power reduction value.

13. The method of claim 9, wherein transmitting an additional signal at an additional power level comprises transmitting the signal in a low power boost region, the low power boost region comprising an initial resource block comprising an index of less than or equal to a ceiling function of the total number of resource blocks for the given channel bandwidth divided by 3 and greater than or equal to a difference of the total number of resource blocks for the given channel bandwidth and a sum of 4 and the ceiling function of the total number of resource blocks for the given channel bandwidth divided by 3, and an additional number of contiguous resource blocks comprising a length greater than or equal to 6.

14. The method of claim 9, wherein transmitting an additional signal at an additional power level comprises transmitting the signal in an additional high power boost region, the additional high power boost region comprising a number of contiguous resource blocks comprising a length less than or equal to the ceiling function of the total number of resource blocks for the given channel bandwidth divided by 10, and an initial resource block comprising an index greater than a ceiling function of the total number of resource blocks for the given channel bandwidth divided by 3 and less than a difference of the total number of resource blocks for the given channel bandwidth and a sum of 4 and the ceiling function of the total number of resource blocks for the given channel bandwidth divided by 3.

15. A tangible, non-transitory, computer-readable medium comprising instructions that, when executed by one or more processors, cause the one or more processors to:

send, to a base station, a first indication of a distance from the base station;

receive, via a receiver, a second indication of a resource block allocation from the base station for transmitting a signal, the resource block allocation corresponding to a resource block allocation region;

transmit the signal, via a transmitter, in a high power boost region comprising a number of contiguous resource blocks comprising a length less than 9 and greater than a ceiling function of a total number of resource blocks for a given channel bandwidth divided by 10, a first resource block greater than a floor function of a quotient of the total number of resource blocks divided by four subtracted by a product of the number of contiguous resource blocks and 0.75, subtracted by 3.75, and the first resource block is less than a floor function of product of the total number of resource blocks and 0.75 subtracted by the number of contiguous resource blocks multiplied by 0.75 and added to 1.

16. The tangible, non-transitory, computer-readable medium of claim 15, wherein the resource block allocation region is defined by a spectral shaping filter, a length of contiguous allocated resource blocks of the resource block allocation, and a starting resource block of the resource block allocation.

17. The tangible, non-transitory, computer-readable medium of claim 16, wherein the instructions are configured to cause the one or more processors to transmit the signal in the high power boost region by applying the spectral shaping filter to shape the signal.

18. The tangible, non-transitory, computer-readable medium of claim 15, wherein transmitting the signal comprises transmitting the signal using a $\pi/2$ binary phase-shift keying spectral shaping filter.

19. The tangible, non-transitory, computer-readable medium of claim 15, wherein the instructions are configured to cause the one or more processors to receive a maximum power reduction value corresponding to the resource block allocation region.

20. The tangible, non-transitory, computer-readable medium of claim 19, wherein the maximum power reduction value comprises an amount of transmission power back-off.

* * * * *